H. T. HERR.
POWER DEVELOPING APPARATUS.
APPLICATION FILED OCT. 25, 1916.
1,343,671.  Patented June 15, 1920.
3 SHEETS—SHEET 1.
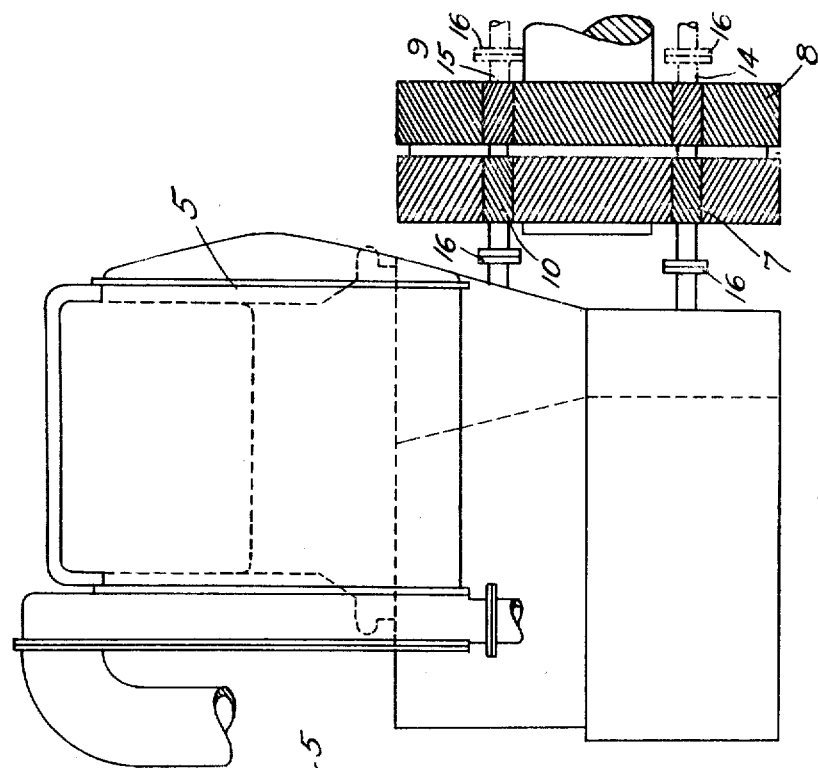
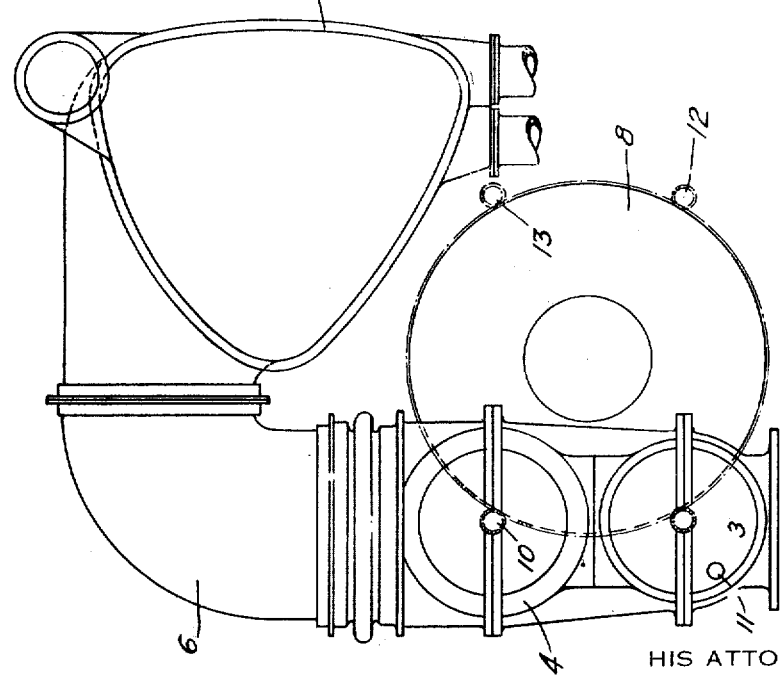
INVENTOR.
Herbert T. Herr
Green & McCallister
HIS ATTORNEYS IN FACT

H. T. HERR.
POWER DEVELOPING APPARATUS.
APPLICATION FILED OCT. 25, 1916.

1,343,671. Patented June 15, 1920.
3 SHEETS—SHEET 2.

INVENTOR.
Herbert T. Herr
BY Green & McCallister
HIS ATTORNEYS IN FACT

H. T. HERR.
POWER DEVELOPING APPARATUS.
APPLICATION FILED OCT. 25, 1916.

1,343,671.

Patented June 15, 1920.
3 SHEETS—SHEET 3.

INVENTOR.
Herbert T. Herr
BY
Green + McCallister
HIS ATTORNEYS IN FACT

UNITED STATES PATENT OFFICE.

HERBERT T. HERR, OF PITTSBURGH, PENNSYLVANIA, ASSIGNOR TO WESTINGHOUSE ELECTRIC & MANUFACTURING COMPANY, A CORPORATION OF PENNSYLVANIA.

POWER-DEVELOPING APPARATUS.

1,343,671.   Specification of Letters Patent.   Patented June 15, 1920.

Application filed October 25, 1916. Serial No. 127,586.

*To all whom it may concern:*

Be it known that I, HERBERT T. HERR, a citizen of the United States, and a resident of Pittsburgh, in the county of Allegheny and State of Pennsylvania, have made a new and useful Invention in Power-Developing Apparatus, of which the following is a specification.

This invention relates to turbines and particularly to turbine installations in which reduction gearing is employed between the turbine elements and the driving agent.

An object of this invention is to produce a geared unit, which is simple and compact and admirably adapted for marine propulsion.

A further object is to produce a simple, compact power developing unit which occupies less space and is lighter than other units of substantially the same capacity now in use and known to me.

A further object is to produce an organized turbine apparatus which is adapted to operate in connection with reduction gearing and which is capable of operating efficiently under wide variations of load.

These and other objects which will be made apparent throughout the further description of my invention are attained by means of apparatus embodying the features herein described and illustrated in the drawings accompanying and forming a part hereof.

In the drawings: Figure 1 is a more or less diagrammatic end elevation of a power developing apparatus embodying my invention.

Fig. 2 is a side elevation of the apparatus illustrated in Fig. 1.

Figure 3:
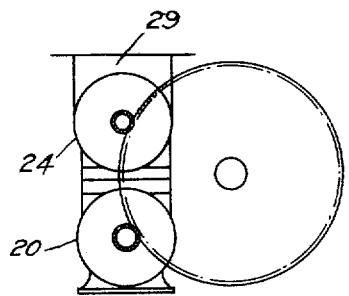
Fig. 3 is a diagrammatic end elevation of a turbine unit shown in connection with reduction gearing.

In marine installations the space available for power developing apparatus is limited, and for that reason it is desirable to develop as large power per unit of engine room space as is possible. This makes compactness of design an essential feature in marine turbine installations. In addition to this, it is ordinarily not feasible to drive the ship's propellers at turbine speeds and consequently some means, such as reduction gearing, are ordinarily interposed between the turbine or turbines and the propeller shaft. Where gears are employed, it is desirable to divide the turbine unit into separate sections for the purpose of reducing the power transmitted per pinion. Where large powers are developed this has necessitated the use of a relatively large number of reduction gears. These gears are ordinarily large and heavy by reason of the fact that they transmit large power and accomplish a relatively large speed reduction, and they consequently increase the weight, size and cost of marine installations.

One of the objects of my present invention is to obtain all of the desirable features resulting from the division of the turbine unit into relatively small sections, but in which the disadvantage resulting from the necessity of employing a relatively large number of separate reduction gearing is eliminated. In the present embodiment of my invention I accomplish this by employing a number of separate turbines or turbine sections so arranged that each turbine or section drives a separate pinion, but all of the pinions driven by the turbines or sections, included in a single unit, mesh with and drive a single driven gear. As illustrated in the drawings, this is accomplished by mounting the separate turbines or turbine sections, comprising a single unit, one above the other and in such relation that the pinions driven by the separate turbines or sections mesh with and drive a single reduction gearing.

In Fig. 1, I have more or less diagrammatically illustrated a power developing unit, including a turbine or turbine section 3, a turbine or turbine section 4 and a speed change gearing, which is driven by both the turbines 3 and 4. The turbines are arranged one above the other and are so located that the separate pinions driven by each of them mesh with and drive a single driven gear 8, which forms a part of the speed change gearing. As shown, the turbine 3 is mounted on the foundation or base plate and is operatively connected to a pinion 7, which meshes with the gear 8. The turbine 4 is shown supported by the casing of the turbine 3, and is operatively connected to a pinion 10, which also meshes with the gear 8. While I have illustrated the turbine 4 mounted on the turbine 3, it will be apparent that independent mounting means may be employed for the turbine 4, or that it may be either wholly or partially supported by the casing of the turbine 3.

While it will be apparent that the turbines 3 and 4 may be independent units, each receiving high pressure motive fluid and expanding it to exhaust or condenser pressure, I have illustrated them as coöperating turbine sections in which one receives high pressure motive fluid, partially expands it, and delivers it to the other, where the fluid is further expanded and is delivered to a condenser 5 through a conduit or passage 6. The turbine 3, as illustrated, is provided with a high pressure fluid inlet port 11 and is provided with an exhaust port which communicates with the inlet port of the turbine 4. The exhaust port of the turbine 4 is located in the top of the casing and discharges into the condenser 5. It will, of course, be apparent that the location of the condenser will in a large measure be determined by the arrangement of the turbines 3 and 4, but as illustrated, the condenser is shown located above the longitudinal axis of the gear 8, and on the opposite side of the axis of the gear from the turbine section with which it communicates. I consider this the preferred arrangement, since it not only conserves space, but also provides sufficient space below the condenser for the installation of auxiliary apparatus.

In addition to this the arrangement is such that two turbine units, similar to the unit illustrated, may be operatively connected to the gear wheel 8. In Fig. 1, I have illustrated additional pinions 12 and 13 meshing with the gear 8, which may be driven by the additional turbine unit. In Fig. 2, I have illustrated in dot dash lines, the shafts 14 and 15 of the respective pinions 12 and 13. From this illustration it will be apparent that a duplicate of the unit illustrated may be employed and that the turbines operatively coupled to the pinions 12 and 13 and included in the additional set will preferably be located on the opposite side of both the longitudinal and vertical axes of the gear 8, from the turbines 3 and 4. With this arrangement a very compact turbine unit is obtained and the power delivered to the driven shaft 9, on which the gear 8 is mounted, may be increased materially without unnecessarily overloading any one of the pinions, or without rendering it necessary to unduly increase the size of the intermeshing teeth. It will of course be apparent that a disconnectible clutch or coupling 16 may be employed between each turbine or turbine section and the pinion driven by it. With this arrangement one or more of the turbines may stand idle without increasing the resistance to rotation of the operating turbines.

Figure 4:
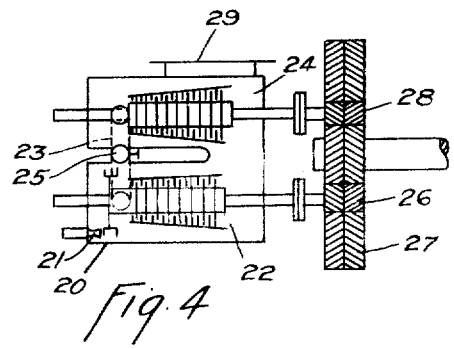
Fig. 4 is a diagrammatic vertical sectional elevation of the apparatus shown in Fig. 3.

In Figs. 3 and 4 I have illustrated an arrangement of turbines in which the lower turbine of the superimposed set receives high pressure motive fluid and delivers partially expanded motive fluid to the upper turbine of the set. As illustrated, the high pressure motive fluid received by the turbine 20 is delivered through one or more expansion nozzles 21 to the initial stage of that turbine. The initial stage is diagrammatically shown as an impulse stage and is provided with two rows of buckets or vanes. The fluid delivered from this stage is capable of being divided into two streams, one of which is delivered to the low pressure element 22 of the turbine 20, whereas the other is capable of being delivered through a pipe or passage 23 to the inlet of the turbine 24. The passage 23 is provided with a valve 25 for controlling the delivery of fluid to the turbine 24 and consequently the turbine 20 may be operated independently of the turbine 24. In the diagrammatic illustration, the element 22 of the turbine 20 exhausts into the exhaust passage of the turbine 24, which is provided with an exhaust port 29. The turbine 20 is shown operatively connected to a pinion 26, which meshes with a gear 27, and the turbine 24 is shown operatively connected to a pinion 28, which also meshes with the gear 27. Any suitable means, such as a disconnectible clutch or coupling 29, may be employed for operatively connecting the turbines to their respective pinions and, as illustrated, the pinion 26 driven by the turbine 20 may be of different diameter from the pinion 28 driven by the turbine 24. With this arrangement the speeds of the turbines may be proportioned so as to produce a relatively light unit having high efficiency. The sections 20 and 24 may be located as shown in Fig. 3, or the section 20 may be located above the section 24.

Figure 5:
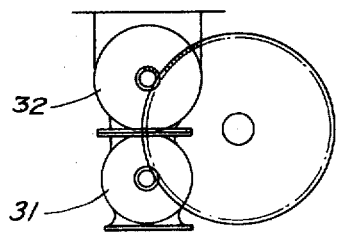
Figs. 5 and 6 are respectively diagrammatic end elevation and vertical sectional views of a modified arrangement of turbine apparatus embodying my invention.
Figure 6:
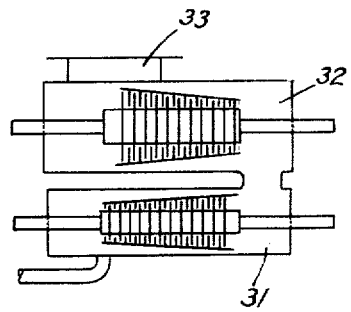

In Fig. 6, I have illustrated diagrammatically a compound turbine in which the motive fluid is delivered to a turbine 31, and after having been partially expanded within the working passages of that turbine, is delivered to a turbine 32, where it is completely expanded and from which it is delivered to a condenser through an exhaust port 33. The sections 31 and 32 may be located one above the other, as shown in Fig. 5, or the section 31 may be located above the section 32.

Figure 9:
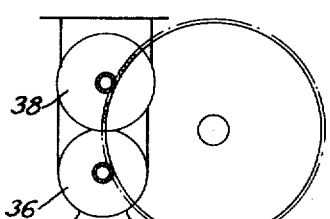
Figs. 9 and 10 are views corresponding to Figs. 5 and 6 and illustrating an arrangement of turbine sections which may be employed in apparatus embodying my invention.
Figure 10:
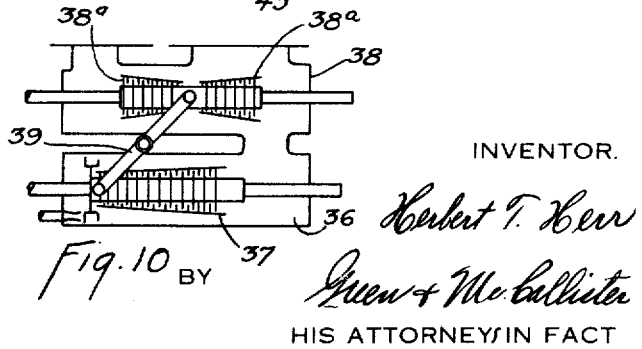

In Figs. 9 and 10, I have diagrammatically shown a turbine unit, which corresponds somewhat to the unit shown in Figs. 3 and 4. The motive fluid is first delivered to the turbine section 36 and after being partially expanded in that section, is divided into three streams, one of which is delivered to the low pressure element 37 of the section 36, whereas the remainder of the fluid is delivered to a turbine section 38. The section 38 is illustrated as a double flow section and is provided with two low pressure elements 38$^a$ through which motive fluid flows in opposite axial directions. As described in connection with Fig. 4, the motive fluid delivered to the section 36 is first delivered to the initial or high pressure stage of that section and then is divided into separate streams. One stream is delivered through the pipe or passage 39 to the inlet port of the section 38, where it is again divided into two streams, each of which is delivered to one of the low pressure elements of the section 38$^a$. The motive fluid exhausted from the element 37 and from each of the low pressure elements of the section 38 is delivered through exhaust ports with which the section 28 is provided. While I have illustrated the section 36 as being mounted below the section 38, it will be apparent that they may be mounted in the reverse relation, and the exhaust ports of the section 38 may deliver into a condenser located below instead of above the combined unit.

Figure 7:
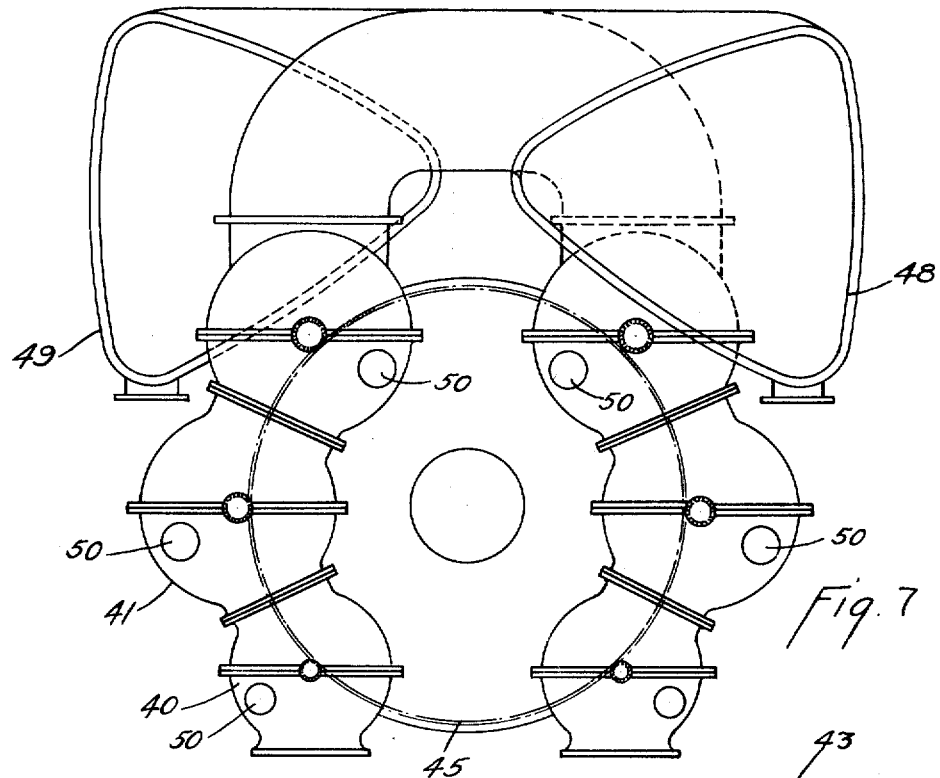
Fig. 7 is a diagrammatic end view of a further modification of my invention.

In Fig. 7, I have illustrated a turbine installation including two sets of superimposed turbines, each set driving pinions which mesh with a single driven gear. As illustrated, each set includes a high pressure turbine 40, which receives high pressure steam and after having partially expanded the same, delivers it to an intermediate pressure turbine 41. The intermediate pressure turbine, like the high pressure turbine, is disclosed as a single flow turbine, but it is so arranged that the fluid flows through it in an opposite axial direction from the direction of flow through the turbine 40. The fluid discharged from the section 41 is delivered to a low pressure turbine 42, which is illustrated as a double flow turbine through the separate elements of which fluid flows in opposite axial directions. Each low pressure element discharges through a separate exhaust port 43 into an exhaust manifold which communicates with a condenser. The turbine 40 is shown operatively connected to a pinion 44, which meshes with a driven gear 45. The turbine 41 is shown operatively connected to a separate pinion 46, which meshes with the gear 45, and the turbine 42 is operatively connected to a gear 47, which also meshes with the gear 45. The separate turbines included in each set are so mounted that their axes are not in the same vertical plane. It will be apparent that under conditions of this kind it may be advisable to mount each turbine independently of the other so that they cannot be termed superimposed turbines, although they are mounted one above the other. The arrangement of turbines illustrated is such that the interior of any turbine of either set is readily accessible. This is accomplished by dividing the casing of each turbine along a horizontal plane passing through the axis of the turbine. The upper portion of each casing may therefore be removed after the superstructure above it is removed. As illustrated, the pinion 44 is of less diameter than the pinion 46 and the pinion 46 is of less diameter than the pinion 47. This arrangement may be employed under conditions where a proportioning of the speeds of the different turbine sections will increase the efficiency and reduce the weight of the combined unit.

In Fig. 7, the condenser 48 serving the unit located on the left side of the gear 45 is located on the right hand side and above the longitudinal axis of the gear, whereas the condenser 49 serving the right hand set is located on the opposite side of the gear 45. It will be apparent that the low pressure turbine 42 of one or both sets may be located at the bottom of the set and consequently that the high pressure turbine may be located at the top. Under such conditions, the position of the condenser serving each set would be varied to suit conditions.

Figure 8:
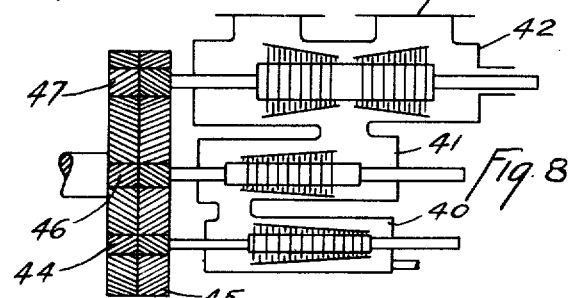
Fig. 8 is a vertical sectional elevation illustrating an arrangement of turbine sections which may be employed in connection with my invention.

While Fig. 8 illustrates diagrammatically an arrangement of turbine sections which may be employed when the turbines are located as illustrated in Fig. 7, it will be apparent that each turbine of Fig. 7 may be an independent turbine, and for this reason, I have shown each separate turbine of Fig. 7 provided with a separate high pressure fluid inlet port 50. Under such conditions, each turbine would, of course, be provided with a separate exhaust port, which would communicate with the exhaust manifold connected to the condenser serving the set. It will, however, be apparent that the turbines 41 and 42 illustrated in Fig. 8 may each be provided with a supplemental high pressure inlet port so that turbines 41 and 42 may be operated independently of the turbine 40, or so that the turbine 42 may be operated independently of both the turbines 40 and 41. The turbines of Fig. 7 may if desired be so arranged that the motive fluid passes in series through all of the turbines of one set, or the turbines of the different sets may be cross compounded.

While I have illustrated several arrangements of turbine sections which may be employed in connection with apparatus embodying my invention, I desire it to be understood that I do not limit myself to an arrangement in which the turbines driving a single gear are arranged in sets of superimposed turbines or sections, since it will be apparent that the sets or turbine units may be disposed in various ways about the driven gear and that one feature of my invention is that the turbines or sections of one unit or set are so arranged, with relation to the driven gear, that an additional set for driving the gear may be located on the opposite side of the gear.

While I have described several embodiments of my invention, it will be apparent that other and various arrangements of turbines or turbine sections may be employed without departing from the spirit and scope of the invention as set forth by the appended claim.

What I claim is:

A power developing apparatus comprising a gear, two turbine units disposed on opposite sides of the gear and on opposite sides of the axis of the said gear, each divided into separate, communicating, superimposed sections, a separate driving pinion operatively connected to the rotor of each section and meshing with the said gear, and a separate condenser communicating with the uppermost section of each unit and located on the side of the axis opposite that on which the unit is located and somewhat above the axis of the gear.

In testimony whereof, I have hereunto subscribed my name this 24th day of October, 1916.

HERBERT T. HERR.